United States Patent
Gopalan et al.

(10) Patent No.: US 9,726,144 B2
(45) Date of Patent: Aug. 8, 2017

(54) METHOD FOR OPTIMIZING THE OPERATION OF A WIND TURBINE

(71) Applicant: General Electric Company, Schenectady, NY (US)

(72) Inventors: Simi Gopalan, Bangalore (IN); Anoop Singh, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 941 days.

(21) Appl. No.: 13/737,406

(22) Filed: Jan. 9, 2013

(65) Prior Publication Data

US 2014/0193254 A1 Jul. 10, 2014

(51) Int. Cl.
*F03D 7/02* (2006.01)
*F03D 7/04* (2006.01)

(52) U.S. Cl.
CPC .............. *F03D 7/022* (2013.01); *F03D 7/043* (2013.01); *F05B 2270/20* (2013.01); *F05B 2270/322* (2013.01); *F05B 2270/325* (2013.01); *F05B 2270/331* (2013.01); *F05B 2270/332* (2013.01); *Y02E 10/723* (2013.01)

(58) Field of Classification Search
CPC . F03D 7/04; F03D 7/042; F03D 7/043; F03D 7/045; F03D 11/0091; F05B 2270/20; F05B 2270/32; F05B 2270/325; F05B 2270/331; F05B 2270/332; Y02E 10/723
See application file for complete search history.

(56) References Cited

U.S. PATENT DOCUMENTS

| | | | |
|---|---|---|---|
| 6,619,918 B1 | 9/2003 | Rebsdorf | |
| 7,883,317 B2 | 2/2011 | Ormel et al. | |
| 8,022,565 B2 * | 9/2011 | Scholte-Wassink | F03D 7/0292 290/44 |
| 2006/0273595 A1 * | 12/2006 | Avagliano | F03D 7/028 290/44 |
| 2008/0086281 A1 | 4/2008 | Santos | |
| 2011/0144815 A1 * | 6/2011 | Neumann | F03D 7/0288 700/287 |
| 2011/0178771 A1 * | 7/2011 | Miranda | F03D 7/0224 702/182 |
| 2013/0181450 A1 * | 7/2013 | Narayana | F03D 7/02 290/44 |

FOREIGN PATENT DOCUMENTS

JP 2005240725 A2 9/2005

OTHER PUBLICATIONS

Search Report and Opinion issued in connection with corresponding Application No. 14150300.3 on Oct. 7, 2014.

* cited by examiner

*Primary Examiner* — Craig Kim
*Assistant Examiner* — Juan G Flores
(74) *Attorney, Agent, or Firm* — GE Global Patent Operation; Douglas D. Zhang

(57) ABSTRACT

A method for optimizing the operation of a wind turbine having a rotor with at least one rotor blade, a tower, and a wind turbine controller, comprises determining a first load status of the wind turbine based on metereological data acquired by sensors, including a turbulence intensity; determining a second load status of the wind turbine based on mechanical loads on at least one wind turbine component; and increasing a load of the wind turbine, if the determined first and second load status of the turbine are within selectable load limits. A wind turbine implementing the method is also disclosed.

9 Claims, 5 Drawing Sheets

300

301 — Determining a first load status of the wind turbine based on metereological data acquired by sensors including a turbulence intensity 302 — determining a second load status of the wind turbine based on mechanical loads on at least one wind turbine component 303 — increasing a load of the wind turbine if the determined first and second load status of the turbine are within selectable load limits

311 — acquiring parameter values for altitude and temperature and determining an air density value from the acquired parameter values 312 — acquiring data on current wind speed and calculating a standard deviation of the wind speed over time 313 — calculating a turbulence intensity from the acquired wind speed data 314 — determining a first load status of the wind turbine based on the determined air density and the determined turbulence intensity 315 — acquiring parameter values on deformation of the rotor blades calculating bending moments based on the deformation data 316 — determining a second load status of the wind turbine based on a comparison of the calculated bending moments with pre stored bending moments 317 — increasing a load of the wind turbine if the determined first and second load status of the turbine are within predefined limits

FIG. 5

METHOD FOR OPTIMIZING THE OPERATION OF A WIND TURBINE

BACKGROUND OF THE INVENTION

The present invention relates to the field of control engineering, in particular to controlling the operation of a wind turbine. Furthermore, the invention relates to wind turbines having a control system.

Generally, a wind turbine includes a turbine that has a rotor that includes a rotatable hub assembly having multiple blades. The blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on top of a base that may be a truss or tubular tower.

Some wind turbine configurations include double-fed induction generators (DFIGs). Such configurations may also include power converters that are used to convert a frequency of generated electric power to a frequency substantially similar to a utility grid frequency. Moreover, such converters, in conjunction with the DFIG, also transmit electric power between the utility grid and the generator as well as transmit generator excitation power to a wound generator rotor from one of the connections to the electric utility grid connection. Alternatively, some wind turbine configurations include, but are not limited to, alternative types of induction generators, permanent magnet (PM) synchronous generators and electrically-excited synchronous generators and switched reluctance generators. These alternative configurations may also include power converters that are used to convert the frequencies as described above and transmit electrical power between the utility grid and the generator.

A wind turbine can only extract a certain percentage of the power associated with the wind, up to the so-called maximum "Betz limit" of 59%. This fraction is described as the power coefficient. The value of the real power coefficient during operation is a function of the form, wind speed, rotation speed and pitch of the specific wind turbine. Assuming all other operational variables to be constant, this coefficient has only one maximum point at a fixed wind speed as the rotational speed is varied. It is therefore known to adjust the rotation speed of the turbine's rotor to this maximum value, that is called "optimal rotation speed" herein. From the rotation speed, the tip-speed ratio is directly derived:

The characteristics of the power coefficient are normally expressed in dependency of the tip-speed-ratio λ (or TSR), which is defined as:

$$\lambda = \frac{v_p}{v} = \frac{\Omega \cdot R}{v}$$

wherein $v_p$ is the tip-speed of the one or more turbine blades, R is the turbine rotor radius, $\Omega$ is the rotational turbine angular velocity and v is the wind speed. The optimal rotation speed for maximum power output thus yields an optimal tip-speed ratio $\lambda_{max}$ or $TSR_{max}$.

Known wind turbines have a plurality of mechanical and electrical components. Each electrical and/or mechanical component may have independent or different operating limitations, such as current, voltage, power, and/or temperature limits, than other components. Moreover, known wind turbines typically are designed and/or assembled with predefined rated power limits. To operate within such rated power limits, the electrical and/or mechanical components may be operated with large margins for the operating limitations. Consequently, many turbines do not run at optimal tip-speed ratio $\lambda_{max}$ or $TSR_{max}$, but at a lower tip-speed ratio. This is, amongst other factors, due to the fact that individual component margins are typically reached for the standard operating conditions taken into account during the design phase of the turbine. If the operating conditions are different from the design conditions, the turbine may thus run with less power output than possible. Such operation may result in inefficient wind turbine operation, and a power generation capability of the wind turbine may be underutilized depending on operating conditions.

BRIEF DESCRIPTION OF THE INVENTION

In a first aspect, a method for optimizing the operation of a wind turbine having a rotor with at least one rotor blade, a tower, and a wind turbine controller is provided. It includes determining a first load status of the wind turbine based on metereological data acquired by sensors, including a turbulence intensity; determining a second load status of the wind turbine based on mechanical loads on at least one wind turbine component; and increasing a load of the wind turbine, if the determined first and second load status of the turbine are within selectable load limits.

In a second aspect, a wind turbine is provided. It includes a tower, at least one rotor blade, at least one wind turbine controller; at least one temperature sensor, at least one altitude sensor; at least one anemometer; at least one sensor for measuring a load on at least one wind turbine component; wherein the wind turbine controller is operable to determine a first load status of the wind turbine including a turbulence intensity, based on metereological data acquired by the at least one anemometer; determining a second load status of the wind turbine, based on mechanical loads on the at least one wind turbine component, determined from data from a sensor for measuring the load on the at least one wind turbine component; and increasing a load of the wind turbine, if the determined first and second load status of the turbine are are within selectable load limits.

In a further aspect, a method for optimizing the operation of a wind turbine including a rotor with at least one blade and a tower is provided. It includes the steps of acquiring parameter values for altitude and temperature, and determining an air density value from the acquired parameter values; acquiring data on current wind speed, and calculating a standard deviation of the wind speed over time; calculating a turbulence intensity from the acquired wind speed data determining a first load status of the wind turbine based on the determined air density and the determined turbulence intensity; acquiring parameter values on deformation of the rotor blades, calculating bending moments based on the deformation data; determining a second load status of the wind turbine, based on a comparison of the calculated bending moments with pre-stored bending moments; increasing a load of the wind turbine, if the determined first and second load status of the turbine are within predefined limits.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein:

FIG. 4 is a schematic diagram of a method according to embodiments.

FIG. 5 is a schematic diagram of a further method according to embodiments.

DETAILED DESCRIPTION OF THE INVENTION

Figure 1:
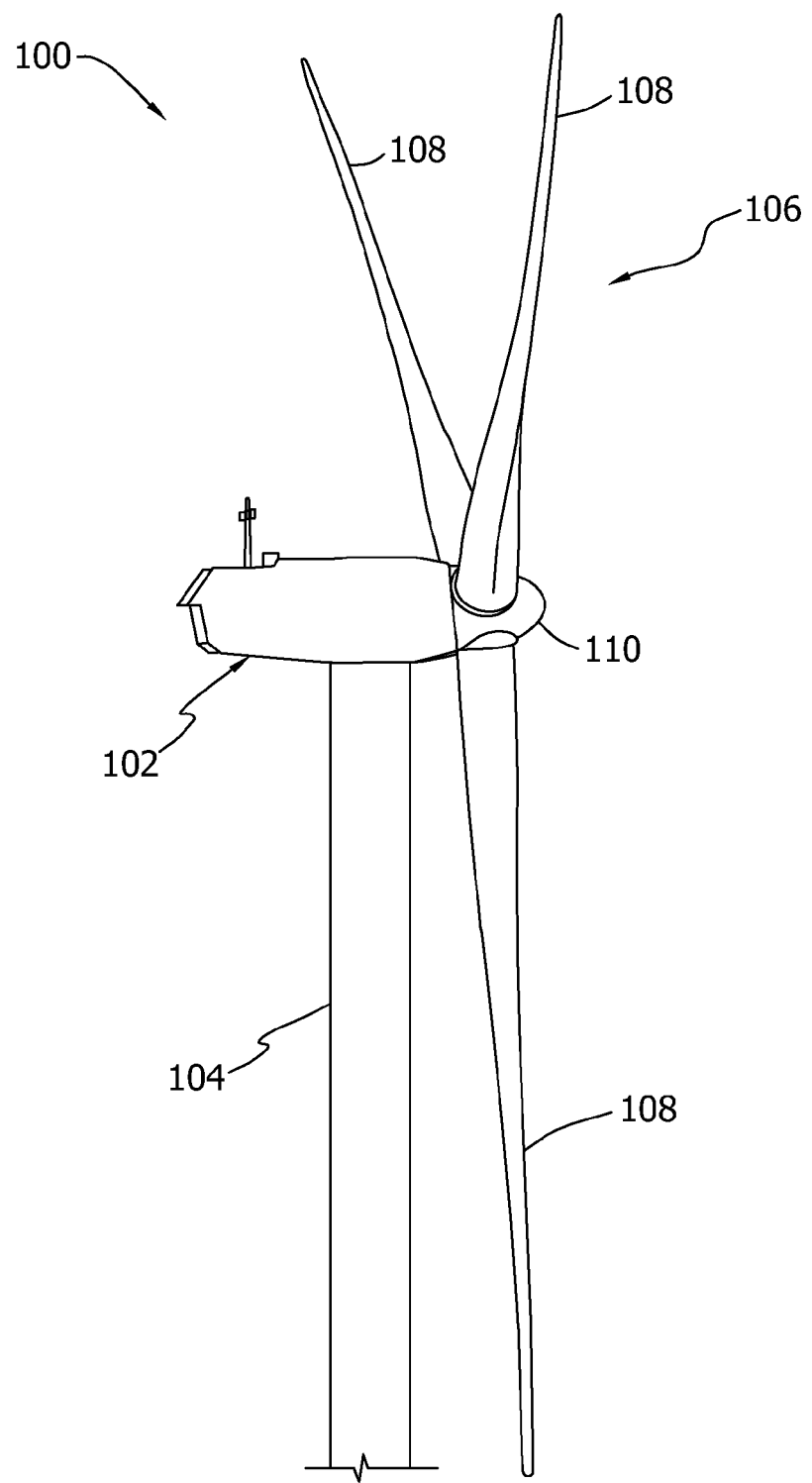
FIG. 1 is a perspective view of a portion of an exemplary wind turbine.

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

The embodiments described herein include a wind turbine system with increased average electrical power output. More specifically, a tip-speed ratio is increased depending on operating conditions in order to improve average power output.

As used herein, the term turbulence intensity is intended to be representative of a value acquired by dividing the standard deviation of measured wind speeds over a certain time, by the wind speed itself As used herein, the term "blade" is intended to be representative of any device that provides a reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power.

In embodiments, a tip-speed ratio (TSR) of the wind turbine is changed depending on environmental conditions, in order to increase average electric power output. If the air density and turbulence intensity is lower at the wind turbine site than the values which were taken into account during design of the turbine, the wind turbine controller senses this, and potentially increases the tip-speed ratio, by increasing a set point for the tip-speed ratio in the turbine controller, so as to cause a rise in average power output of the turbine. Thereby, an air density is calculated from altitude and measured temperature. Further, a turbulence intensity value is calculated based on wind speed standard deviation, and wind speed calculated from an estimator. Based on the calculated air density and turbulence intensity, the tip-speed ratio is changed based on a linear relationship between the two. In order to stay within safety limits for mechanical stress on components of the turbine, a check for bending moments on parts of the turbine is also performed in the process. In particular, outplane moments are calculated from a deformation of a rotor blade, typically by using proximity sensor data and rotor position sensor data. The calculated outplane moments are compared, e,g, by using a lookup table provided in the wind turbine controller logic. Furthermore, a fast fourier transformation (FFT) of the outplane moments is performed and also compared with pre-stored data of FFT parameters, thereby checking if current frequency and amplitude values of the are differing from values in a lookup-table. If the outplane moments are within pre-defined limits, the wind turbine controller changes a setpoint for the tip-speed ratio based on the air density and turbulence intensity. If the comparison with the lookup table yields the result that absolute values for the outplane bending moments are close to or above predefined limits, the tip-speed ratio is not changed, or may be reduced to be within limits. In embodiments, the air density may also be derived from measurements of the air pressure with a pressure sensor, and the air temperature via a thermometer or thermosensor, which are used as input values for the wind turbine controller to calculate the air density.

FIG. 1 is a perspective view of a portion of an exemplary wind turbine 100. Wind turbine 100 includes a nacelle 102 housing a generator (not shown in FIG. 1). Nacelle 102 is mounted on a tower 104 (a portion of tower 104 being shown in FIG. 1). Tower 104 may have any suitable height that facilitates operation of wind turbine 100 as described herein. Wind turbine 100 also includes a rotor 106 that includes three blades 108 attached to a rotating hub 110. Alternatively, wind turbine 100 includes any number of blades 108 that facilitates operation of wind turbine 100 as described herein. In the exemplary embodiment, wind turbine 100 includes a gearbox (not shown in FIG. 1) operatively coupled to rotor 106 and a generator (not shown in FIG. 1).

Figure 2:
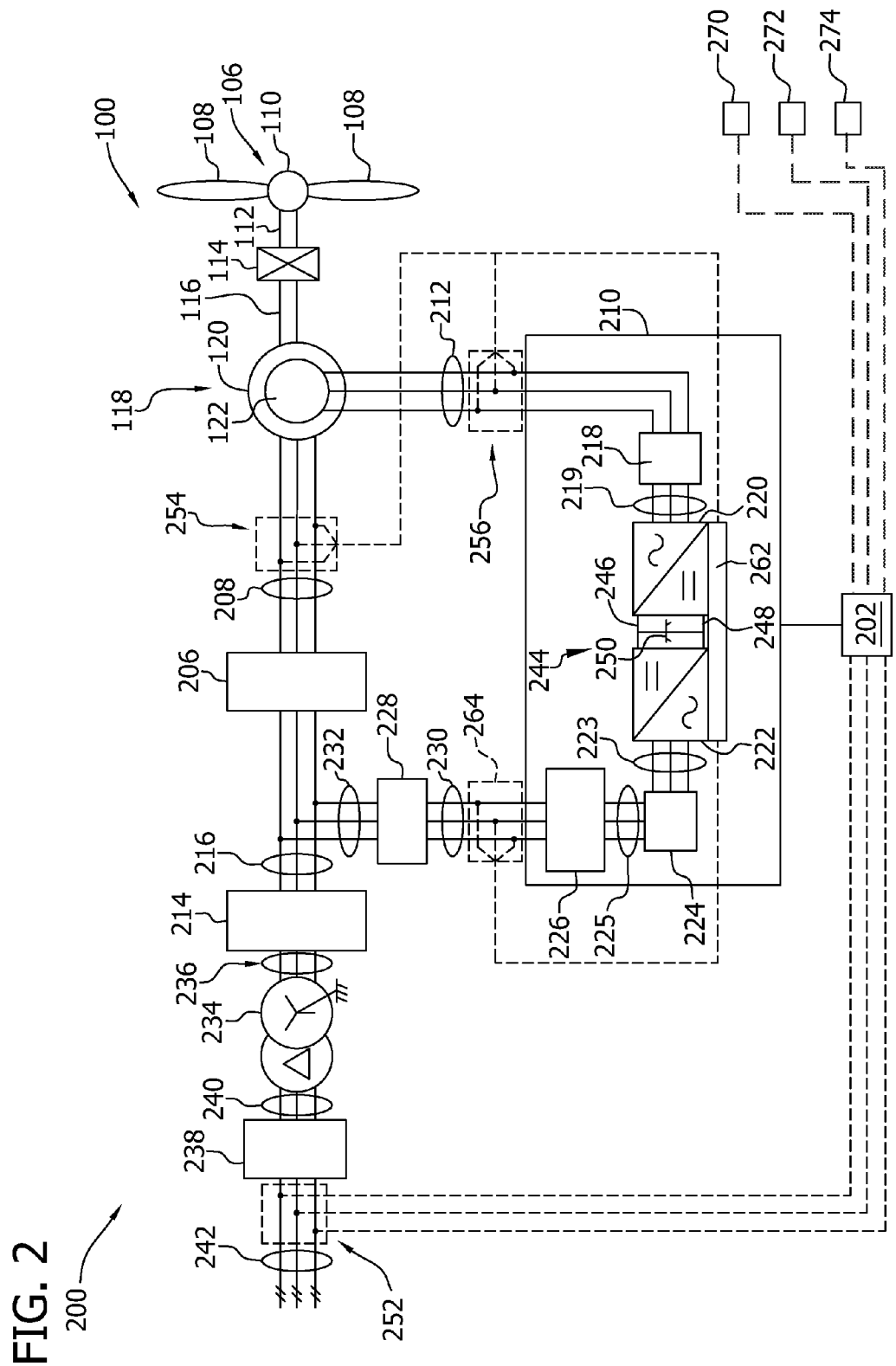
FIG. 2 is a schematic view of an electrical and control system suitable for use with the wind turbine shown in FIG. 1, according to embodiments.

FIG. 2 is a schematic view of an exemplary electrical and control system 200 that may be used with wind turbine 100. Rotor 106 includes blades 108 coupled to hub 110. Rotor 106 also includes a low-speed shaft 112 rotatably coupled to hub 110. Low-speed shaft 112 is coupled to a step-up gearbox 114 that is configured to step up the rotational speed of low-speed shaft 112 and transfer that speed to a high-speed shaft 116. In the exemplary embodiment, gearbox 114 has a step-up ratio of approximately 70:1. For example, low-speed shaft 112 rotating at approximately 20 revolutions per minute (rpm) coupled to gearbox 114 with an approximately 70:1 step-up ratio generates a speed for high-speed shaft 116 of approximately 1400 rpm. Alternatively, gearbox 114 has any suitable step-up ratio that facilitates operation of wind turbine 100 as described herein. As a further alternative, wind turbine 100 includes a direct-drive generator that is rotatably coupled to rotor 106 without any intervening gearbox.

High-speed shaft 116 is rotatably coupled to generator 118. In the exemplary embodiment, generator 118 is a wound rotor, three-phase, double-fed induction (asynchronous) generator (DFIG) that includes a generator stator 120 magnetically coupled to a generator rotor 122. In an alternative embodiment, generator rotor 122 includes a plurality of permanent magnets in place of rotor windings.

Electrical and control system 200 includes a turbine controller 202. Turbine controller 202 includes at least one processor and a memory, at least one processor input channel, at least one processor output channel, and may include at least one computer (none shown in FIG. 2). As used herein, the term computer is not limited to integrated circuits referred to in the art as a computer, but broadly refers to a processor, a microcontroller, a microcomputer, a programmable logic controller (PLC), an application specific integrated circuit, and other programmable circuits (none shown in FIG. 2), and these terms are used interchangeably herein. In the exemplary embodiment, memory may include, but is not limited to, a computer-readable medium, such as a random access memory (RAM) (none shown in FIG. 2). Alternatively, one or more storage devices, such as a floppy disk, a compact disc read only memory (CD-ROM), a magneto-optical disk (MOD), and/or a digital versatile disc (DVD) (none shown in FIG. 2) may also be used. Also, in the exemplary embodiment, additional input channels (not shown in FIG. 2) may be, but are not limited to, computer peripherals associated with an operator interface such as a mouse and a keyboard (neither shown in FIG. 2). Further, in the exemplary embodiment, additional output channels may include, but are not limited to, an operator interface monitor (not shown in FIG. 2).

Processors for turbine controller 202 process information transmitted from a plurality of electrical and electronic devices that may include, but are not limited to, voltage and current transducers. RAM and/or storage devices store and transfer information and instructions to be executed by the processor. RAM and/or storage devices can also be used to store and provide temporary variables, static (i.e., non-changing) information and instructions, or other intermediate information to the processors during execution of instructions by the processors. Instructions that are executed include, but are not limited to, resident conversion and/or comparator algorithms. The execution of sequences of instructions is not limited to any specific combination of hardware circuitry and software instructions.

Generator stator 120 is electrically coupled to a stator synchronizing switch 206 via a stator bus 208. In an exemplary embodiment, to facilitate the DFIG configuration, generator rotor 122 is electrically coupled to a bi-directional power conversion assembly 210 via a rotor bus 212. Alternatively, generator rotor 122 is electrically coupled to rotor bus 212 via any other device that facilitates operation of electrical and control system 200 as described herein. As a further alternative, electrical and control system 200 is configured as a full power conversion system (not shown) that includes a full power conversion assembly (not shown in FIG. 2) similar in design and operation to power conversion assembly 210 and electrically coupled to generator stator 120. The full power conversion assembly facilitates channeling electric power between generator stator 120 and an electric power transmission and distribution grid (not shown). In the exemplary embodiment, stator bus 208 transmits three-phase power from generator stator 120 to stator synchronizing switch 206. Rotor bus 212 transmits three-phase power from generator rotor 122 to power conversion assembly 210. In the exemplary embodiment, stator synchronizing switch 206 is electrically coupled to a main transformer circuit breaker 214 via a system bus 216. In an alternative embodiment, one or more fuses (not shown) are used instead of main transformer circuit breaker 214. In another embodiment, neither fuses nor main transformer circuit breaker 214 is used.

Power conversion assembly 210 includes a rotor filter 218 that is electrically coupled to generator rotor 122 via rotor bus 212. A rotor filter bus 219 electrically couples rotor filter 218 to a rotor-side power converter 220, and rotor-side power converter 220 is electrically coupled to a line-side power converter 222. Rotor-side power converter 220 and line-side power converter 222 are power converter bridges including power semiconductors (not shown). In the exemplary embodiment, rotor-side power converter 220 and line-side power converter 222 are configured in a three-phase, pulse width modulation (PWM) configuration including insulated gate bipolar transistor (IGBT) switching devices (not shown in FIG. 2) that operate as known in the art. Alternatively, rotor-side power converter 220 and line-side power converter 222 have any configuration using any switching devices that facilitate operation of electrical and control system 200 as described herein. Power conversion assembly 210 is coupled in electronic data communication with turbine controller 202 to control the operation of rotor-side power converter 220 and line-side power converter 222.

In the exemplary embodiment, a line-side power converter bus 223 electrically couples line-side power converter 222 to a line filter 224. Also, a line bus 225 electrically couples line filter 224 to a line contactor 226. Moreover, line contactor 226 is electrically coupled to a conversion circuit breaker 228 via a conversion circuit breaker bus 230. In addition, conversion circuit breaker 228 is electrically coupled to main transformer circuit breaker 214 via system bus 216 and a connection bus 232. Alternatively, line filter 224 is electrically coupled to system bus 216 directly via connection bus 232 and includes any suitable protection scheme (not shown) configured to account for removal of line contactor 226 and conversion circuit breaker 228 from electrical and control system 200. Main transformer circuit breaker 214 is electrically coupled to an electric power main transformer 234 via a generator-side bus 236. Main transformer 234 is electrically coupled to a grid circuit breaker 238 via a breaker-side bus 240. Grid circuit breaker 238 is connected to the electric power transmission and distribution grid via a grid bus 242. In an alternative embodiment, main transformer 234 is electrically coupled to one or more fuses (not shown), rather than to grid circuit breaker 238, via breaker-side bus 240. In another embodiment, neither fuses nor grid circuit breaker 238 is used, but rather main transformer 234 is coupled to the electric power transmission and distribution grid via breaker-side bus 240 and grid bus 242.

In the exemplary embodiment, rotor-side power converter 220 is coupled in electrical communication with line-side power converter 222 via a single direct current (DC) link 244. Alternatively, rotor-side power converter 220 and line-side power converter 222 are electrically coupled via individual and separate DC links (not shown in FIG. 2). DC link 244 includes a positive rail 246, a negative rail 248, and at least one capacitor 250 coupled between positive rail 246 and negative rail 248. Alternatively, capacitor 250 includes one or more capacitors configured in series and/or in parallel between positive rail 246 and negative rail 248.

Turbine controller 202 is configured to receive a plurality of voltage and electric current measurement signals from a first set of voltage and electric current sensors 252. Moreover, turbine controller 202 is configured to monitor and control at least some of the operational variables associated with wind turbine 100. In the exemplary embodiment, each of three voltage and electric current sensors 252 are electrically coupled to each one of the three phases of grid bus 242. Alternatively, voltage and electric current sensors 252 are electrically coupled to system bus 216. As a further alternative, voltage and electric current sensors 252 are electrically coupled to any portion of electrical and control system 200 that facilitates operation of electrical and control system 200 as described herein. As a still further alternative, turbine controller 202 is configured to receive any number of voltage and electric current measurement signals from any number of voltage and electric current sensors 252 including, but not limited to, one voltage and electric current measurement signal from one transducer.

As shown in FIG. 2, electrical and control system 200 also includes a converter controller 262 that is configured to receive a plurality of voltage and electric current measurement signals. For example, in one embodiment, converter controller 262 receives voltage and electric current measurement signals from a second set of voltage and electric current sensors 254 coupled in electronic data communication with stator bus 208. Converter controller 262 receives a third set of voltage and electric current measurement signals from a third set of voltage and electric current sensors 256 coupled in electronic data communication with rotor bus 212. Converter controller 262 also receives a fourth set of voltage and electric current measurement signals from a fourth set of voltage and electric current sensors 264 coupled in electronic data communication with conversion circuit breaker bus 230. Second set of voltage and electric current sensors 254 is substantially similar to first set of voltage and electric current sensors 252, and fourth set of voltage and electric current sensors 264 is substantially similar to third set of voltage and electric current sensors 256. Converter controller 262 is substantially similar to turbine controller 202 and is coupled in electronic data communication with turbine controller 202. Moreover, in the exemplary embodiment, converter controller 262 is physically integrated within power conversion assembly 210. Alternatively, converter controller 262 has any configuration that facilitates operation of electrical and control system 200 as described herein.

During operation, wind impacts blades 108 and blades 108 transform wind energy into a mechanical rotational torque that rotatably drives low-speed shaft 112 via hub 110. Low-speed shaft 112 drives gearbox 114 that subsequently steps up the low rotational speed of low-speed shaft 112 to drive high-speed shaft 116 at an increased rotational speed. High speed shaft 116 rotatably drives generator rotor 122. A rotating magnetic field is induced by generator rotor 122 and a voltage is induced within generator stator 120 that is magnetically coupled to generator rotor 122. Generator 118 converts the rotational mechanical energy to a sinusoidal, three-phase alternating current (AC) electrical energy signal in generator stator 120. The associated electrical power is transmitted to main transformer 234 via stator bus 208, stator synchronizing switch 206, system bus 216, main transformer circuit breaker 214 and generator-side bus 236. Main transformer 234 steps up the voltage amplitude of the electrical power and the transformed electrical power is further transmitted to a grid via breaker-side bus 240, grid circuit breaker 238 and grid bus 242.

In the exemplary embodiment, a second electrical power transmission path is provided. Electrical, three-phase, sinusoidal, AC power is generated within generator rotor 122 and is transmitted to power conversion assembly 210 via rotor bus 212. Within power conversion assembly 210, the electrical power is transmitted to rotor filter 218 and the electrical power is modified for the rate of change of the PWM signals associated with rotor-side power converter 220. Rotor-side power converter 220 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple associated with AC rectification.

The DC power is subsequently transmitted from DC link 244 to line-side power converter 222 and line-side power converter 222 acts as an inverter configured to convert the DC electrical power from DC link 244 to three-phase, sinusoidal AC electrical power with pre-determined voltages, currents, and frequencies. This conversion is monitored and controlled via converter controller 262. The converted AC power is transmitted from line-side power converter 222 to system bus 216 via line-side power converter bus 223 and line bus 225, line contactor 226, conversion circuit breaker bus 230, conversion circuit breaker 228, and connection bus 232. Line filter 224 compensates or adjusts for harmonic currents in the electric power transmitted from line-side power converter 222. Stator synchronizing switch 206 is configured to close to facilitate connecting the three-phase power from generator stator 120 with the three-phase power from power conversion assembly 210.

Conversion circuit breaker 228, main transformer circuit breaker 214, and grid circuit breaker 238 are configured to disconnect corresponding buses, for example, when excessive current flow may damage the components of electrical and control system 200. Additional protection components are also provided including line contactor 226, which may be controlled to form a disconnect by opening a switch (not shown in FIG. 2) corresponding to each line of line bus 225.

Power conversion assembly 210 compensates or adjusts the frequency of the three-phase power from generator rotor 122 for changes, for example, in the wind speed at hub 110 and blades 108. Therefore, in this manner, mechanical and electrical rotor frequencies are decoupled from stator frequency.

Under some conditions, the bi-directional characteristics of power conversion assembly 210, and specifically, the bi-directional characteristics of rotor-side power converter 220 and line-side power converter 222, facilitate feeding back at least some of the generated electrical power into generator rotor 122. More specifically, electrical power is transmitted from system bus 216 to connection bus 232 and subsequently through conversion circuit breaker 228 and conversion circuit breaker bus 230 into power conversion assembly 210. Within power conversion assembly 210, the electrical power is transmitted through line contactor 226, line bus 225, and line-side power converter bus 223 into line-side power converter 222. Line-side power converter 222 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple sometimes associated with three-phase AC rectification.

The DC power is subsequently transmitted from DC link 244 to rotor-side power converter 220 and rotor-side power converter 220 acts as an inverter configured to convert the DC electrical power transmitted from DC link 244 to a three-phase, sinusoidal AC electrical power with pre-determined voltages, currents, and frequencies. This conversion is monitored and controlled via converter controller 262. The converted AC power is transmitted from rotor-side power converter 220 to rotor filter 218 via rotor filter bus 219 and is subsequently transmitted to generator rotor 122 via rotor bus 212, thereby facilitating sub-synchronous operation.

Power conversion assembly 210 is configured to receive control signals from turbine controller 202. The control signals are based on sensed conditions or operating characteristics of wind turbine 100 and electrical and control system 200. The control signals are received by turbine controller 202 and used to control operation of power conversion assembly 210. Feedback from one or more sensors may be used by electrical and control system 200 to control power conversion assembly 210 via converter controller 262 including, for example, conversion circuit breaker bus 230, stator bus and rotor bus voltages or current feedbacks via second set of voltage and electric current sensors 254, third set of voltage and electric current sensors 256, and fourth set of voltage and electric current sensors 264. Using this feedback information, and for example, switching control signals, stator synchronizing switch control signals and system circuit breaker control (trip) signals may be generated in any known manner. For example, for a grid voltage transient with predetermined characteristics, converter controller 262 will at least temporarily substantially suspend the IGBTs from conducting within line-side power converter 222. Such suspension of operation of line-side power converter 222 will substantially mitigate electric power being channeled through power conversion assembly 210 to approximately zero.

According to embodiments, the wind turbine further includes a proximity sensor 270, for example for measuring a distance of a rotor blade to the tower, an anemometer 274 typically located on a nacelle of the turbine for measuring wind speed, and optionally a rotor position sensor 272 for measuring an angular position of the rotor in its turning plane. The proximity sensor may be, for example, located at the tower and delivers data on a distance of a rotor blade passing the proximity sensor 274. The sensors are typically coupled to wind turbine controller 202.

Figure 3:
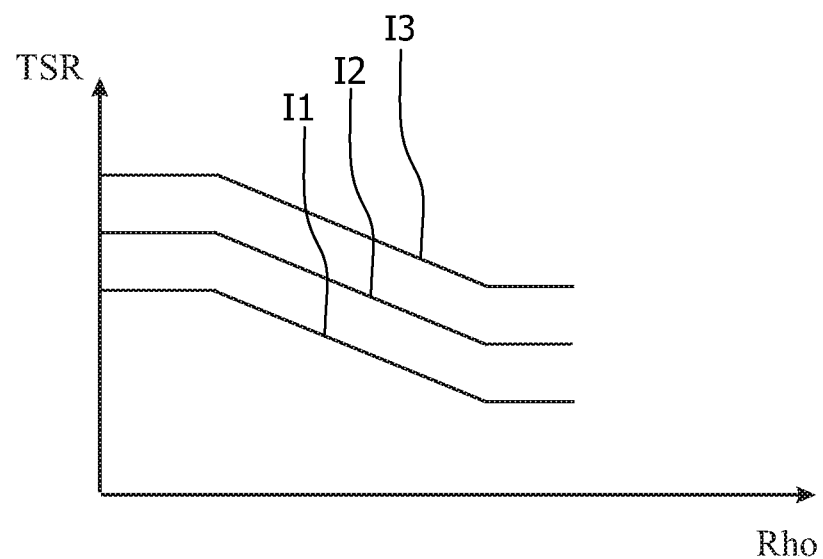
FIG. 3 is a schematic view of the relation between air density, turbulence intensity and tip-speed ratio in a wind turbine according to embodiments.

FIG. 3 shows a diagram of the tip-speed ratio of the turbine (on the vertical axis) and the air density Rho (horizontal axis) at the wind turbine site. The three parallel curves represent various turbulence intensities I1, I2, I3, wherein I1 is representative for the highest turbulence intensity, and I3 for the lowest. When the turbulence intensity increases while the air density remains constant, a lower tip-speed ratio is allowable. On the other hand, at the same turbulence intensity value (represented by one of the curves I1, I2, I3), at a higher air density, the allowable tip-speed ratio is smaller. The wind turbine controller 202 according to embodiments is operable to adjust the highest allowable tip-speed ratio for the currently present operating conditions, respectively operating parameters air density and turbulence intensity, which will be shown in greater detail below.

FIG. 4 shows a schematic diagram of a method 300 for optimizing the operation of a wind turbine, according to embodiments. The wind turbine controller is operable to determine a first load status of the wind turbine including a turbulence intensity (block 301), based on metereological data acquired by the at least one anemometer; determining a second load status of the wind turbine, based on mechanical loads on the at least one wind turbine component (block 302), determined from data from a sensor for measuring the load on the at least one wind turbine component; and increasing a load of the wind turbine, if the determined first and second load status of the turbine are within selectable load limits (block 303).

Therein, a first and a second load status of the wind turbine are determined, typically by the wind turbine controller 202, which acquires a number of sensor values for this purpose. The first load status of the wind turbine is typically determined based on metereological data acquired by sensors. A load of the wind turbine is increased, if the determined first and second load status of the turbine are within or below selectable load limits.

A typical value used in determining the first load status is the turbulence intensity at the site of the wind turbine. The turbulence intensity is calculated by dividing the statistical standard deviation of the wind speed over a preselected time interval, for example 1 minute, 5 minutes or 10 minutes, by the average wind speed during the preselected time interval. The calculated value is regarded to be a representative parameter for a mechanical load on the wind turbine. Thereby, a value of a present air density is also taken into account in accordance with the relation shown in FIG. 3. Thus, the first load status is determined by taking into account air density and turbulence intensity.

Typically, an anemometer 270 is used to measure wind speed. Also, an estimator may be used. From the first load status as determined above from current values for turbulence intensity and air density, the wind turbine controller 202 derives if a tip-speed ratio might be elevated at the present load conditions in order to increase an electrical power output of the turbine, whereby the subsequent decision for rising the tip-speed ration is made under a second boundary condition, which is laid out in the following.

In order not to mechanically overload the turbine due to a rise of the tip-speed ratio on the basis of the above calculations for the first load status, also a second load status of the wind turbine is taken into account. The second load status typically takes into account a measured mechanical load, respectively stress, on at least one wind turbine component. To this end, a variety of parameters may be taken into account, for example bending moments on the tower, bending moments on the rotor blades, or the like. In some embodiments, outplane bending moments on the rotor blades are determined.

These may typically be calculated from data on a deformation of at least one rotor blade. Typically, a proximity sensor is mounted on the wind turbine, for example at the tower in a height where a rotor blade sweeps by the sensor during operation of the turbine. The sensor may be realized in a variety of ways, for example by using ultrasound sensors or optical sensors. From the sensor data, the wind turbine controller 202, or another control unit dedicated for this purpose, can calculate the deformation of the rotor blade. The deformation is taken as a representative value for the mechnical load induced on the rotor blades. The wind turbine controller 202 compares the determined values for the outplane bending moments with pre-stored values in a lookup table, whereby the table comprises values for the outplane bending moments which represent margins respectively limits which should not be exceeded, or safety limits. In embodiments, also other parameters may be measured as representatives of a strain on the turbine, such as a bending moment on the wind turbine tower, which may be measured by strain gauges.

In the case of measuring outplane bending moments on rotor blades, the outplane bending moments can be derived from the out-of-plane-deformation of one rotor blade by the following relations, determining D and Q moments well known to a skilled person:

$$D = \text{blade-1-out-of-plane} \cdot \cos(\text{rotorpos} \cdot pi/180-0) + \text{blade-2-out-of-plane} \cdot \cos(\text{rotorpos} \cdot pi/180-120) + \text{blade 3 out-of-plane} \cdot \cos(\text{rotorpos} \cdot pi/180-240)$$

$$Q = \text{blade-1-out-of-plane}*\cos(\text{rotorpos}*\text{pi}/180\text{-}0\text{-pi}/2) + \text{blade-2-out-of-plane}*\cos(\text{rotorpos}*\text{pi}/180\text{-}120\text{-pi}/2) + \text{blade-3-out-of-plane}*\cos(\text{rotorpos}*\text{pi}/180\text{-}240\text{-pi}/2)$$

Thereby, the deformation of rotor blades 2 and 3 is in relationship to the deformation of blade 1, whereby the relation can be determined from simulations and/or experiments. Thus, when blade 1 is at a particular rotor postion, the corresponding out-of-plane moments at the second and the third blade can be determined.

The outplane bending moments derived by this method are then compared with values stored in a lookup table, comprising allowed outplane bending moments. If the determination of the outplane bending moments yields that they are below tolerable levels or margins, a next step is carried out. In this step, a fast fourier transformation is performed on the outplane bending moments over a preselected time interval, which may for example be from 30 seconds to 10 minutes. Predefined parameters derived from the fast fourier transformation may include coefficients, for example. These parameters are compared by the wind turbine controller 202 with prestored values in a lookup table. Again, if the determined parameters are within the limits indicated by the prestored parameters, the controller decides that a power output of the wind turbine can be increased. This is typically carried out by increasing the tip-speed ratio. Typically, a set point for the tip-speed ratio is increased.

FIG. 5 shows a schematical view of an exemplary method 310 according to embodiments. The method includes the steps of acquiring parameter values for altitude and temperature, and determining an air density value from the acquired parameter values (block 311); acquiring data on current wind speed, and calculating a standard deviation of the wind speed over time (block 312); calculating a turbulence intensity from the acquired wind speed data (313) determining a first load status of the wind turbine based on the determined air density and the determined turbulence intensity (block 314); acquiring parameter values on deformation of the rotor blades, calculating bending moments based on the deformation data (block 315); determining a second load status of the wind turbine, based on a comparison of the calculated bending moments with pre-stored bending moments (block 316); increasing a load of the wind turbine, if the determined first and second load status of the turbine are within predefined limits (block 317).

The above-described systems and methods facilitate a wind turbine with increased average electrical power output. More specifically, they facilitate a wind turbine wherein the power output is increased in dependency of measured loads.

Exemplary embodiments of systems and methods for a wind turbine are described above in detail. The systems and methods are not limited to the specific embodiments described herein, but rather, components of the systems and/or steps of the methods may be utilized independently and separately from other components and/or steps described herein, and are not limited to practice with only the wind turbine systems as described herein. Rather, the exemplary embodiment can be implemented and utilized in connection with many other rotor blade applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method for optimizing the operation of a wind turbine having a rotor with at least one rotor blade, a tower, and a wind turbine controller, the method comprising:
   determining, via one or more sensors, a turbulence intensity value;
   determining, via one or more sensors, an air density value;
   determining, via the wind turbine controller, a first load status of the at least one rotor blade of the wind turbine as a function of the turbulence intensity value and the air density value;
   measuring, via a proximity sensor, a distance between the at least one rotor blade and the tower to determine a blade deformation of the at least one rotor blade;
   determining, via the wind turbine controller, outplane bending moments of the at least one rotor blade based on the blade deformation;
   determining, via the wind turbine controller, a second load status of the at least one rotor blade of the wind turbine as a function of the outplane bending moments of the at least one rotor blade;
   increasing, via the wind turbine controller, a set point for the tip-speed ratio of the wind turbine based on the first load status if the second load status of the wind turbine is within selectable load limits.

2. The method of claim 1, further comprising determining the turbulence intensity value as a function of sensor data about wind speed and wind speed standard deviation.

3. The method of claim 1, further comprising determining the air density value as a function of an ambient temperature.

4. The method of claim 1, further comprising comparing the determined outplane bending moments with stored data on outplane bending moments.

5. The method of claim 1, wherein determining the second load status of the at least one rotor blade of the wind turbine as a function of the outplane bending moments further comprises performing a fast fourier transformation on outplane bending moments data, and comparing predefined parameters from the fast fourier transformation with stored data.

6. The method of claim 1, wherein outplane bending moments are calculated from D/Q moments.

7. The method of claim 1, further comparing the determined air density value and the turbulence intensity value with stored data in a lookup table.

8. A computer-implemented method for optimizing the operation of a wind turbine including a tower and a rotor with at least one rotor blade, the method comprising:
   acquiring parameter values for altitude and temperature and determining an air density value from the acquired parameter values;

acquiring, via one or more sensors, data on current wind speed and calculating a standard deviation of the current wind speed over time;

calculating, via a wind turbine controller, a turbulence intensity value from the current wind speed data;

determining, via the wind turbine controller, a first load status of the at least one rotor blade of the wind turbine as a function of the determined air density value and the calculated turbulence intensity value;

measuring, via a proximity sensor, a distance between the at least one rotor blade and the tower to determine a blade deformation of the at least one rotor blade;

determining, via the wind turbine controller, outplane bending moments of the at least one rotor blade based on the blade deformation;

determining, via the wind turbine controller, a second load status of the at least one rotor blade of the wind turbine based on a comparison of the outplane bending moments with pre-stored outplane bending moments;

increasing, via the wind turbine controller, a set point for the tip-speed ratio of the wind turbine based on the first load status if the second load status of the wind turbine is within predefined limits.

9. The method of claim 8, wherein determining the second load status at least one rotor blade of the wind turbine further comprises performing a fast fourier transformation (FFT) on acquired data on bending moments over a time span.

* * * * *